Aug. 6, 1929.  J. JONAS  1,723,512
WATER LEVEL INDICATOR FOR HIGH PRESSURE STEAM BOILERS
Filed July 2, 1924
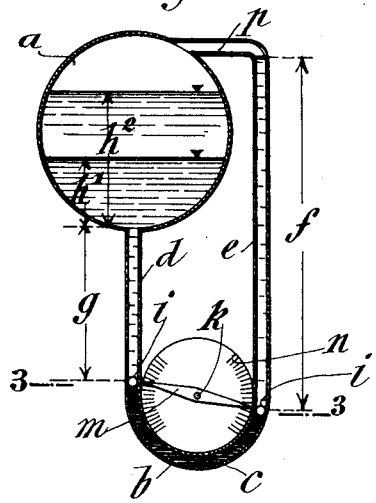
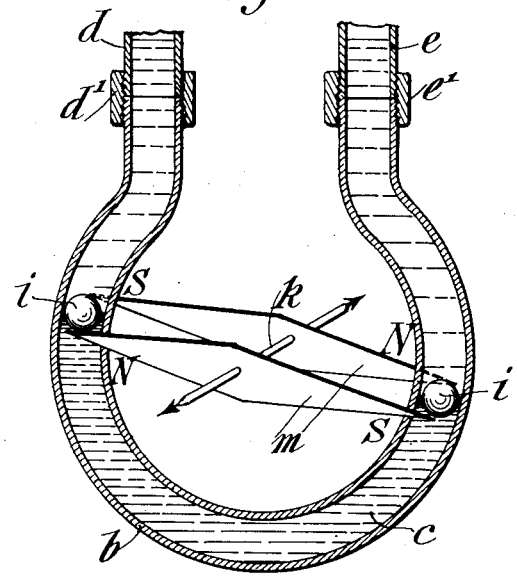
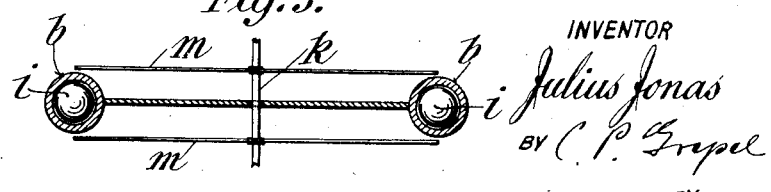
INVENTOR
Julius Jonas
BY C. P. Goepel
ATTORNEY.

Patented Aug. 6, 1929.

1,723,512

UNITED STATES PATENT OFFICE.

JULIUS JONAS, OF BADEN, SWITZERLAND, ASSIGNOR OF ONE-HALF TO GUSTAVE HOFFMANN, OF UNION HILL, NEW JERSEY.

WATER-LEVEL INDICATOR FOR HIGH-PRESSURE STEAM BOILERS.

Application filed July 2, 1924, Serial No. 723,633, and in Germany December 13, 1923.

This invention relates to water level indicators for high pressure steam boilers, and has for its object to enable the water level within the boiler to be determined, in such cases where the pressures exceed about 20 atmospheres and where frangible glass gauges are not utilizable.

It has been found that the water gauges used with ordinary steam boilers with a pressure up to 20 atmospheres, are useless when used with higher pressures, because the bursting of the glass cannot be avoided when the higher pressures are used. It has been proposed for the purpose of ascertaining the water level in high pressure boilers, to do without the direct reading of the water level, and to use indirect ways. But these, until now, were not satisfactory.

For this purpose, my invention consists of a high pressure resisting water gauge, having a fluid metal therein move by relative water columns, and having magnetic means on the level of the fluid metal and movable therewith in the interior of the gauge, and magnetic means exterior of the gauge and co-operating with the interior means, whereby the level may be accurately indicated, even though the gauge is not transparent.

The invention consists of further features which will be hereinafter more fully described, shown in the drawings and pointed out in the claim.

In the drawings, an embodiment of my invention is shown, in which

Figure 1 is a sectional view showing the general arrangement of the apparatus;

Figure 2 is a section of the lower part of the U-shaped gauge, with the needles in perspective, and Figure 3 is a horizontal section on line 3—3 of Figure 1.

Similar reference characters designate corresponding parts throughout the several views.

Referring to the drawings, the U-shaped water gauge $b$ is connected at one end with the lowest part of the boiler and at the other end with the highest part of the boiler. Its lower curved part is filled with a liquid metal, for instance, mercury $c$, and above the mercury both shanks $d$ and $e$ are filled with water. The height of the water column in the pipe $e$ which rests on the right end of the mercury mass $c$ is constant. On the left end of the mercury mass $c$, a water column in the shank $d$ presses, which has a height $q$ plus $h$, whereby $h$ indicates the variable height of the water level in the boiler over its bottom or lowest part. If, therefore, the level in the boiler drops one centimeter, say from $h^2$ to $h^1$, the mercury level in the left shank $d$ of the U-shaped gauge $b$ ascends $\frac{1}{2} \times \frac{1}{13.6} = 0.37$ centimeters, and descends in the right shank $e$ for the same amount.

For the purpose of indicating from the outside, the water level changes and the thereby resulting changes of the mercury level, a steel ball $i$ is placed so as to swim on each of both mercury levels. Outside the U-shaped gauge in the center of the pipe bend, a pendant $m$ is arranged on an axle $k$. The pendant consists in the embodiment of a magnetic needle in the shape of an astatic needle pair $m$, with opposite poles NS and SN respectively, arranged one upon another for the purpose of avoiding the influence of the terrestrial magnetism. The ends of the magnetic needle $m$ align precisely in position with the balls $i$ due to the magnetic attractions. A scale $n$ is provided which is concentrically arranged with the curved part of the U-shaped gauge $b$. The needles passing over the scale permit accurate readings to be taken.

In Figure 2, an enlarged view of parts of the device shown in Figure 1 is shown. It is made of a material which will not destroy the magnetic attraction between the needles $m$ and balls $i$, and which also will not be dissolved by the mercury. The whole U-shaped gauge, or the gauge as shown in Figure 2, is, for instance, produced from nickel, which as known, will only superficially amalgamate, but remains substantially insensible to the action of mercury. The bend $b$ is connected with water and pressure tight connections $d^1$ and $e^1$, to the iron shanks $d$ and $e$.

Instead of using mercury, the bend of the gauge can be supplied with any other suitable metal, as a known metal of a low melting point, as for instance, Wood or Lettern metal. It is then necessary to take care that the temperature of the indicator during the working of the boiler is higher than 70° C., which is the melting temperature of these metals, and it is further necessary to elect for the gauge bend a material, which will not be dissolved by the mentioned liquid metals.

The indicating means for the variations of the water level can be modified. For instance, on the axle $k$, a large light indicator can be arranged which moves on a dial plate, which is visible at a long distance. The magnet needle need not be arranged in or parallel to the plane of the gauge bend. It can be arranged vertically thereto. The magnetic needles can also be arranged in other manners, for instance, not turnable on an axle, but on a straight or curved path, or magnetically actuated devices can be arranged to be movable on the nickel gauge itself.

The indicator can also be provided with contacts, and connections can be provided for distance signaling, or devices for danger indications can be provided.

If the steam boiler is portable, as on locomotives, it is possible to dampen the motions of the mercury, which motions are caused by the shaking of the machine, by increasing the friction in interior of the gauge bend, as by roughing the inner surface, by diaphragms or baffler, wire enclosures, etc.

For the purpose of maintaining the level of water in the pipe shank $e$ substantially constant and to compensate for the water which is lost due to the shaking of the machine or evaporation, it is possible to maintain the horizontal upper pipe part $p$ cool, so that the steam condenses on the walls of the pipe, or it is possible to provide a special branch pipe above the shank $e$, which branch pipe is cooled, and from which the shank $e$ is continuously fed with condensed water.

From the foregoing, it will be seen that my invention consists essentially in the provision of a holder containing a non-compressible mobile medium and communicating at one of its ends with the interior of the boiler to receive variable pressures therefrom acting against said mobile medium together with means in the opposite end of the holder for maintaining an opposing pressure upon said medium, and means for translating the movements of the mobile medium in terms indicative of variations in the boiler pressure. I believe this fundamental idea to be new in the art, and it will be apparent that the same may be advantageously applied to low pressure as well as high pressure steam boilers.

I have described various embodiments of my invention but changes may be made therein without departing from the spirit of my invention, as defined in the appended claim.

I claim as new:

In combination with a high pressure steam boiler having a water section and a steam section, a tube having upwardly extending branches, means for connecting one of said branches of the tube to the water section of said boiler, independent means for connecting the other branch of the tube to the steam section of the boiler, a column of mercury disposed in the tube and exposed at opposite ends to the pressure respectively of the water and steam of the boiler, floating magnetic elements disposed in the branches of the tube and supported upon the opposite ends of the column of mercury, and an indicator mounted exteriorly of the tube and having magnetic means arranged adjacent said floating magnetic elements and adapted to move therewith for indicating variations in the movement of said column of mercury.

In testimony that I claim the foregoing as my invention and have signed my name hereto.

JULIUS JONAS.